(12) United States Patent
Boggs et al.

(10) Patent No.: US 6,740,155 B1
(45) Date of Patent: May 25, 2004

(54) METHOD OF DELAYING THE SET TIME OF CEMENT AND THE COMPOSITIONS PRODUCED THEREFROM

(75) Inventors: Bruce Boggs, Kennesaw, GA (US); Douglas Rhodes, Kennesaw, GA (US)

(73) Assignee: ISG Resources, Inc., South Jordan, UT (US)

( * ) Notice: Subject to any disclaimer, the term of this patent is extended or adjusted under 35 U.S.C. 154(b) by 0 days.

(21) Appl. No.: 10/228,009

(22) Filed: Aug. 26, 2002

Related U.S. Application Data
(60) Provisional application No. 60/314,912, filed on Aug. 24, 2001.

(51) Int. Cl.$^7$ ............................................... C04B 24/04
(52) U.S. Cl. .................. 106/728; 106/705; 106/708; 106/709; 106/713; 106/724; 106/819; 106/823
(58) Field of Search .............................. 106/705, 708, 106/709, 713, 724, 728, 819, 823

(56) References Cited

U.S. PATENT DOCUMENTS

| | | | |
|---|---|---|---|
| 3,782,992 A | 1/1974 | Uchikawa et al. | |
| 3,864,138 A | 2/1975 | Uchikawa et al. | |
| 4,190,454 A | 2/1980 | Yamagisi et al. | |
| 4,306,912 A | 12/1981 | Forss | |
| 4,313,763 A | 2/1982 | Turpin, Jr. | |
| 4,470,850 A | 9/1984 | Bloss | |
| 4,494,990 A | 1/1985 | Harris | |
| 4,640,715 A | 2/1987 | Heitzmann et al. | |
| 4,642,137 A | 2/1987 | Heitzmann et al. | |
| 4,715,896 A | 12/1987 | Berry | |
| 4,842,649 A | 6/1989 | Heitzmann et al. | |
| 4,997,484 A | 3/1991 | Gravitt et al. | |
| 5,075,358 A | 12/1991 | Riley et al. | |
| 5,223,035 A | 6/1993 | Hopkins et al. | |
| 5,346,550 A | 9/1994 | Kunzi et al. | |
| 5,358,760 A | 10/1994 | Furlong et al. | |
| 5,387,283 A | 2/1995 | Kirkpatrick et al. | |
| 5,435,843 A | 7/1995 | Roy et al. | |
| 5,439,518 A | 8/1995 | Francis et al. | |
| 5,489,334 A | 2/1996 | Kirkpatrick et al. | |
| 5,490,889 A | 2/1996 | Kirkpatrick et al. | |
| 5,536,310 A | 7/1996 | Brook et al. | |
| 5,556,458 A | 9/1996 | Brook et al. | |
| 5,565,028 A | 10/1996 | Roy et al. | |
| 5,624,491 A | 4/1997 | Liskowitz et al. | |
| 5,653,797 A | 8/1997 | Patel | |
| 5,685,903 A | 11/1997 | Stav et al. | |
| 5,693,137 A | 12/1997 | Styron | |
| 5,714,002 A | 2/1998 | Styron | |
| 5,714,003 A | 2/1998 | Styron | |
| 5,728,209 A | * 3/1998 | Bury et al. .................. 106/819 |
| 5,779,786 A | 7/1998 | Patel | |
| 5,788,761 A | 8/1998 | Hums et al. | |
| 5,858,083 A | 1/1999 | Stav et al. | |
| 5,997,632 A | 12/1999 | Styron | |
| 6,068,131 A | 5/2000 | Styron et al. | |
| 6,139,960 A | 10/2000 | Styron et al. | |
| 6,149,724 A | 11/2000 | Ulibarri et al. | |
| 6,241,816 B1 | 6/2001 | Ronin | |
| 6,242,098 B1 | 6/2001 | Styron et al. | |
| 6,251,178 B1 | 6/2001 | Styron | |
| 6,482,258 B2 | * 11/2002 | Styron ........................ 106/709 |

OTHER PUBLICATIONS

Pietersen et al., Reactivity of Class F Fly Ash in Concrete—Implications for Mix Design, Strength and Durability, pp. 55–1 through 55–18, no date.

Pietersen et al., Reactivity of Fly Ash at High pH, Mat. Res. Soc. Symp. Proc. vol. 178, 1990 Materials Research Society, pp. 139–157, no month.

Katz, Microscopic Study of Alkali–Activated Fly Ash, Cement and Concrete Research, vol. 28, No. 2, 1998, pp. 197–208, USA, no month.

\* cited by examiner

*Primary Examiner*—Elizabeth D. Wood
(74) *Attorney, Agent, or Firm*—Wegman, Hessler & Vanderbur

(57) ABSTRACT

The invention pertains to a method of delaying the set time of cement and to compositions produced therefrom. The set time of hydraulic cement mixtures of fly ash pozzolans, specifically Class C and Class F, and Portland cement can be delayed by controlling the pH of a retarder slurry that is mixed with the dry components of the composition. The pH of the retarder slurry is controlled by balancing the salts therein such that the retarder slurry is acidic, or having a pH less than 7. The slurry activator of the present invention generally includes a pH balancing agent, an acid component, and water. The pH balancing agent can include any basic alkali and alkaline earth metal hydroxide, or a salt of the acid component. The acid component may include a hydroxy-carboxylic acid, preferably citric acid. Slower setting mortar and concrete compositions having high strength can be prepared with this hydraulic cement.

15 Claims, No Drawings

METHOD OF DELAYING THE SET TIME OF CEMENT AND THE COMPOSITIONS PRODUCED THEREFROM

CROSS-REFERENCE TO RELATED APPLICATION

This application claims the priority benefit of U.S. Provisional Patent Application No. 60/314,912 filed Aug. 24, 2001.

FIELD OF THE INVENTION

The invention pertains to a method of delaying the set time of cement and to the compositions produced therefrom. More specifically, the set time of the cement composition is increased through the use of an acidic retarder slurry.

BACKGROUND OF THE INVENTION

In many instances, it is important to retard or delay the setting time of cement mixtures. For example, increased setting time is desirable in cases where the cement slurry is mixed and then transported to a remote work site. Increased work time or delayed setting is also important in those situations in which the cement is poured and must be troweled or otherwise formed into a desired structural shape.

The prior art has taught the use of coal fly ash in cementitious applications where high calcium containing ash is utilized. These ashes can be used in combination with both Portland cement and retardants or accelerators, to retard or accelerate the set time of the cement. Variations in setting time in cement compositions comprising fly ash pozzolans and Portland cement have been shown to be achieved by changing the order of introduction of an activator (e.g., citric acid or potassium hydroxide). Additionally, premixing of specific chemicals (e.g., citric acid and fly ash) also has been shown to have an effect on the setting times of cement compositions.

SUMMARY OF THE INVENTION

Although the prior art discloses that the rate of hardening of cement can be controlled by the use of retarding or accelerating additives, it has failed to teach the role that pH can provide in retarding or delaying the setting time.

In accordance with the invention, the set time of hydraulic cement mixtures of fly ash pozzolans, specifically Class C and Class F, and Portland cement can be delayed by controlling the pH of a retarder slurry that is preferably used to mix with the dry components of the composition. The pH of the retarder slurry is controlled by balancing the salts therein such that the retarder slurry is acidic, or having a pH less than 7. Slower setting mortar and concrete compositions can be prepared with this hydraulic cement while the compositions can still achieve high strengths over time.

With respect to the fly ash component of the cement composition, exemplary fly ashes include a Class "F" & "C" combination of pozzolan that meets the requirements of ASTM C-618. This specification limits the loss-on-ignition (LOI) content of fly ash pozzolan to less than 6%. The LOI value of fly ash is generally equal to the percent by weight of the unburned carbon content of the fly ash. This carbon content can vary from as little as about 0.5% up to 20% or more of the weight of the total fly ash product. However, for pozzolanic activity, a good quality fly ash should contain less than 1% carbon but, in any case, no more than about 4% carbon.

Generally, balance of non-lignite Class F fly ash vis-a-vis the more alkaline Class C ash can be controlled so as to control the pH of the dry components, to delay or to retard the setting of the cement mix. Lignitic Class F fly ash contains significant amounts of CaO, and thus its use in the instant invention is not preferred.

Preferably, Portland Cement (ASTM C-150) maybe used in the instant cement compositions as the hydraulic cement component. An ASTM Type I Portland Cement can be mentioned as exemplary, and this component should have as low an alkali content as is available. The higher the alkali content of the cement, the more likely that the cement will cause alkali burns on the skin of the tradesmen who use the product. The Type I Sun Belt, Capitol, and Texas Lehigh Portland Cements are most preferred. Type II and Type V Portland Cements may be used where sulfate resistance is an issue.

Type III Portland Cement is not preferred. Type III Portland Cement produces high Portland strengths but does not impact the speed with which the pozzolans react. Lime liberation by a Portland Cement is roughly related to the gain in compressive strength. As a result, Type III cements can produce an excess of calcium oxide in the mortar before the majority of the reaction water has been absorbed. This can lead to permanent efflorescence.

Type IV Portland Cement can be used, but there are no advantages in using it and may be some disadvantages in its use in cold weather.

Slurries having excess acid such that the pH is less than 7, preferably between 4–6, sufficiently retard the set time for cement compositions. The retarder slurry of the present invention generally includes an acid component, a pH balancing agent, and water.

Accordingly, the acid component of the slurry may include a hydroxycarboxylic acid component which may be any hydroxy-bearing carboxylic acid having one or more carboxylic acid moieties; e.g., it may be a mono-, di-, or tri-carboxylic acid compound. The hydroxy di- and tri-carboxy acids are presently preferred with citric, malic, malonic, glyoxylic and glycolic acids being exemplary. Citric acid is presently the most preferred.

The pH balancing agent of the activator can include any basic alkali and alkaline earth metal hydroxide. Examples of alkali earth metal hydroxides include lithium, sodium, potassium, and rubidium hydroxides while alkaline earth metal hydroxides herein include calcium, strontium, and magnesium hydroxides. Additionally, the pH balancing agent may comprise the salt of any of the above hydroxycarboxylic acid components such as potassium citrate, the potassium salt of citric acid, which is the most preferred.

Traditional retarding components, such as common sugar or metal salts, including borax and gypsum, may be present in the retarder slurry to further control the set time of the composition, although the use of the same is not necessary.

A buffering system can also be employed to help stabilize the retarder slurry or solution. Suitable buffers include $Na_2HPO_4$/citric acid solution buffers, and those skilled in the art will readily fashion the required amounts of the $Na_2HPO_4$ and citric acid components that should be used to promote stability at a given or requisite desired acidic pH level. The buffering system can be present in an amount of about 1–10 wt %, based on the combined weight of the retarder slurry.

Water is added to the pH balancing agent of the retarder slurry so that the weight percent of the slurry adds up to 100 wt %. Then, the acid component may be added in a certain weight percentage.

Further, with respect to the cement composition, aggregate such as sand (e.g., fine, white, silica, etc.), clay, lime, etc. is used as filler material therein. The aggregate should be non-absorptive, angular and hard with moisture content preferable less than 0.05%. Finally, water is added so that the weight percent of the final cement composition adds up to 100%.

The method for retarding the set time of cement includes providing a retarder slurry with a pH of less than 7, preferably between 4–6. The retarder slurry is formed by combining about 10–15 wt % of a, the pH balancing agent no greater than about 5 wt % of an optional additional retarding component, and water with the foregoing adding up to 100 wt %. Additional 1–12 wt % of an acid component is added to the mixture so that the slurry is acidic.

Fly ash F and C, Portland Cement, and aggregate are provided in varying weight percentages. Preferably about 5–20 wt % for each of the fly ash F and C components, about greater than about 20 wt % of the Portland cement, and about 50–70 wt % of aggregate are provided to equal 100 wt % of the dry mix. With respect to the acidic retarder slurry, about 1–12 wt % of retarder slurry for each 100 parts by weight of the dry cementitious composition then is mixed with the fly ash, Portland cement, and aggregate. Finally, additional water is added to the mixture.

The charts below illustrate one specific example of a cement composition of the present invention, and the results achieved therefrom:

| CEMENT COMPOSITION | | |
| --- | --- | --- |
| RATIO | Weight | % of Weight |
| C Ash | 394.45 | 10.73% |
| F-Ash ML | 394.45 | 10.73% |
| PC | 338.1 | 9.19% |
| Aggregate | 2254 | 61.30% |
| Retarder Slurry | 281 | 7.64% |
| Add H$_2$O | 15 | 0.41% |
| Final weight | 3710 | 100.00% |
| Strength | 3 hour | 24 hours |
| Cube #1 | 2766 | 5226 |
| Cube #2 | 3040 | 4955 |
| Cube #3 | 2995 | 5383 |
| Average PSI | 2934 | 5188 |

| Shrinkage Air | 3-hour Initial | 28 day | % difference |
| --- | --- | --- | --- |
| BAR #1 | 0.019 | | −0.19 |
| BAR #2 | 0.0226 | | −0.226 |

| Set Time | INT | Final |
| --- | --- | --- |
| Minutes | 12 | 13 |

Notably, the acidic retarder slurry has a pH of 5.76 with the cement composition having a final cement set time of 13 minutes and an average strength of 5188 psi after 24 hours.

As stated above, the pH balancing agent may comprise the salt of any of the above hydroxycarboxylic acid components such as potassium citrate, the potassium salt of citric acid, which is the most preferred.

Additionally, about 0.2% by wt of sodium benzoate may be added to the slurry to inhibit microbial growth. Sodium benzoate has an ability to inhibit growth of various mold and fungi while having no affect on the accelerating performance of the cement.

The citric acid, potassium citrate, and sodium benzoate should be fine granular technical grade preferably purchased from Archer Daniels Midland Company (ADM) located in Decatur, Ill. Each ingredient should be purchased in bags and the bags should be protected from moisture. Any material in open bags should be transferred to 5-gallon plastic buckets with tight fitting lids. When preparing to mix these ingredients, soft lumps should be broken up while hard lumps should be discarded.

When producing activator, the temperature of the water should be maintained at not less than 60 degrees F. Consistent formulation of the slurry is important. The alkaline slurry preferably contains approximately 10–15% potassium citrate/citric acid mixture whose ratios can be varied to control set time and strength development of the overall mixture.

When mixing in a 4-foot diameter tank, one-eighth inch in height represents one gallon. Molded-in scales on a tank are approximate and should not be relied on as being accurate. To reduce the amount of error, to the extent possible, same amount of activator should be mixed each time. The fill-line should be marked and should not be varied from. The tank should not be moved as setting at a slightly different angle will impact the volume in relation to the fill-line.

Mixing the activator is an art as well as a science. While mixing times are given below, the solution must be examined to see that all components are dissolved before adding the next chemical. For batches of 500 gallons or less: Add water to the fill-line, start pump and circulate the water to insure that there are no crystals in the pump, add sodium benzoate and mix for 15 minutes, add potassium citrate and mix for 10 minutes, then add citric acid and mix for 45 minutes before bottling the activator.

After a batch of activator is made, all of the batch preferably should be bottled. If for any reason activator is left in the mixing tank, it should be maintained at a temperature not less than 50 degrees F. Prior to bottling, the activator must be circulated for 15 minutes and checked that all crystals have dissolved. It is noted that once crystals form in the activator, they are more difficult to dissolve then when the original components were dissolved.

The proportioning of the dry mix likewise is important. There are two basic methods that can be used along with a hybrid of the two.

| RETARDER SLURRY COMPOSITION | | | |
| --- | --- | --- | --- |
| RATIO | Bulk Weight | % of Weight | Mix Weight |
| H$_2$O | 3402 | 84.08% | 236.27 |
| Pot. Hydroxide | 508 | 12.56% | 35.28 |
| Borax | 136 | 3.36% | 9.45 |
| Final weight | 4046 | 100.00% | 281.00 |
| Citric Acid | 100 | 2.47% | 6.95 |

Activator pH: 5.76

In method 1, the dry ingredients are stored in silos. They are metered into a weigh-batcher with electronic load cells and computer controls. Each batch contains approximately 3200 pounds. If any component is over 2% off, the formula should be adjusted to insure that the components are within tolerance.

In method 2, the dry ingredients are stored in bags that have been filled to an accuracy of plus or minus 0.5 pounds. Batches are formulated by adding bags of raw material and then completing the batch by using raw material that has been weighted out. Care must be taken in weighing out the components and in insuring that each bag is completely emptied into the blender. The formula size is adjusted so that even bags of portland cement can be used.

In Method 3, one or more of the dry components may be added from silos while the remaining component(s) may be added from bags.

With each method, the weigh-batcher should be checked each day to insure that there is no binder or other malfunction that would cause the weights to be inaccurate. A material balance should be performed each day to compare throughput with the production that occurred. If a variation of greater than 1% occurs, the source of error should be determined and corrected. The dry components should be mixed until homogenous, but not less than 3 minutes. After blending, the material will be filled into buckets that contain about 0.5 gallon jugs of activator. Lids shall be placed on the buckets and tapped to seal.

When the pH balancing agent includes the salt of the acid component, preferably potassium citrate, the final product will take set in approximately 30 minutes after the addition of the activator at 70 degrees F. Higher temperatures will accelerate the rate of set and lower temperatures will slow the rate of set. The mixture of liquid activator and dry aggregate/binder must be thoroughly mixed for 2 minutes to produce a uniform mixture. Set times can be measured by ASTM methodology using Vicat and Gilmore needles.

The final product will develop a minimum unconfined compressive strength of 2300–2500 psi within 3 hours of the addition of the activator followed by adequate mixing for the specified 2 minutes when maintained undisturbed at 70 degrees F. The standard ASTM methods can be employed to measure these attributes.

The final product can be adequately mixed using any conventional concrete or mortar mixing equipment. It is emphasized that care must be taken to rapidly transport and place the mixture before setting begins.

The charts below illustrate examples of another cement composition of the present invention having accelerated set time including desirable characteristics and traits of the dry mix and activator compositions, and the results achieved from the cement composition.

The following data was generated using Port Neal C-Ash, Martin Lake F-Ash and Lafarge Type I/II Portland cement. Lab Batch will refer to the following mix ratio unless otherwise noted:

| Raw Material | Batch g. | Weight |
| --- | --- | --- |
| C Ash | 375 | 10.07% |
| F Ash | 375 | 10.07% |
| Portland Cement | 375 | 10.07% |
| Aggregate | 2254 | 60.51% |
| Water | 270 | 7.25% |
| K Citrate | 50 | 1.34% |
| Citric Acid | 25 | 0.67% |
| Sodium Benzoate | 0.7 | 0.02% |
| Total | 3724.7 | 100.00% |

In order to control set time and continue to achieve desired compressive strength, shifts in the pH of the activator were obtained by adjusting the citric acid. These incremental shifts above and below "control" pH produced the control of set time necessary for production. The date below was generated using Port Neal C-Ash:

| Citric %* | 3-hour | 24-hour | pH | Initial Set | Final Set |
| --- | --- | --- | --- | --- | --- |
| 9.84 | 1670 | 4653 | 4.24 | 21 | 46 |
| 8.55 | 1768 | 4519 | 4.4 | 38 | 43 |
| 7.23 | 2343 | 4767 | 4.77 | 15 | 20 |
| 5.87 | 2587 | 4932 | 5 | 10 | 13 |

*% of the mass of activator

Variations (reductions) in potassium citrate concentrations resulted in marked reduction of compressive strength and extended set times. With current data, the concentration of potassium citrate is necessary to achieve desired strength requirements.

In order to maximize performance, several sources of C-Ash were investigated to gauge applicability to the binder system. All sources were compatible to a degree but Cason type C-Ash was selected based on performance, logistics and availability:

| Ash | CaO | Int. Set | Final Set | 3 Hour PSI | 24 Hour PSI |
| --- | --- | --- | --- | --- | --- |
| Fayette | 24.4 | 35 | 40 | 1742 | 3232 |
| Parrish | 24.64 | 31 | 38 | 1655 | 3546 |
| Cason | 25.29 | 35 | 41 | 1794 | 3892 |
| Boyce | 25.94 | 38 | 45 | 1964 | 4100 |
| PN 3 | 27.52 | 30 | 37 | 2131 | 4381 |

The effect of temperature on the final product is similar to conventional concrete in that elevated temperature decreases set time and decreased temperature produces extended set times. Current field data support this:

| Strength | 7 hour | 28 Days |
| --- | --- | --- |
| Ambient Cure 72° F. | | |
| Ambient PSI | 6437 | 8223 |
| Cold Cure 26° F. | | |
| Cold PSI | 4127 | 6732 |
| Hot Cure 100° F. | | |
| Hot PSI | 6786 | 14184 |

It is further noted that to maximize performance of the binder system, a sound well graded aggregate is necessary. The absorption of the aggregate will dictate the amount of paste necessary to coat and penetrate each particle.

Current production will be consistent with exception of the activator, which will change according to the "heat" or quality of C-Ash and Portland cement utilized for production. The following is the activator composition for the lab batch:

| Water | 78.10% |
| --- | --- |
| K Citrate | 14.46% |
| Citric Acid | 7.23% |
| Sodium Benzoate | 0.20% |
| Total | 100.0% |

The following is the "powder" binder composition for the lab batch:

| Raw Material | Batch g. | Weight |
|---|---|---|
| C Ash | 375.00 | 33.33% |
| F Ash | 375.00 | 33.33% |
| Portland Cement | 375.00 | 33.33% |
| Total | 1125.00 | 100.0% |

The following is the aggregate to binder ratio:

| | | |
|---|---|---|
| C Ash | 375 | 11.10% |
| F Ash | 375 | 11.10% |
| Portland Cement | 375 | 11.10% |
| Aggregate | 2254 | 66.71% |
| Total | 3379 | 100.00% |

Aggregate used in production of the final product should be dried to moisture a content of 0.05%. Moisture appears to be a sensitive physical property causing extended set and reduced strengths when elevated at production.

The following is the breakdown of the components for a variety of acceptable Class C fly ashes:

| Chemical | PN C-Ash | Cason | Fayette | Boyce | WA Parish |
|---|---|---|---|---|---|
| Sodium Oxide, Na2o | 1.56% | 1.71% | 1.61% | 1.91% | 1.42% |
| Magnesium Oxide, MgO | 4.60% | 5.16% | 4.41% | 4.25% | 3.85% |
| Aluminum Oxide, Al2O3 | 17.77% | 18.00% | 18.50% | 17.64% | 18.38% |
| Silicon Dioxide, SiO2 | 29.55% | 32.14% | 34.38% | 29.75% | 34.85% |
| Phosphorus Pentoxide, P2O5 | 1.50% | 1.51% | 1.03% | 1.38% | 1.32% |
| Sulfur Trioxide, SO3 | 2.41% | 2.50% | 1.70% | 2.75% | 1.64% |
| Potassium Oxide, K2O | 0.43% | 55.00% | 0.65% | 0.49% | 0.53% |
| Calcium Oxide, CaO | 27.52% | 25.29% | 24.40% | 25.94% | 24.64% |
| Titanium Dioxide, TiO2 | 1.10% | 1.06% | 1.08% | 1.07% | 1.12% |
| Iron Oxide, Fe2O3 | 6.63% | 5.61% | 5.23% | 8.29% | 7.59% |

The following is the breakdown of the components for Type I/II Portland Cement and F-Ash used in the lab batch:

| Chemical | Lab Type I/II | Pseudoelement | Value |
|---|---|---|---|
| Sodium Oxide, Na2O | 0.10% | C3S (>0.64) | 64.09% |
| Magnesium Oxide, MgO | 1.32% | C2S | 5.13% |
| Aluminum Oxide, Al2O3 | 4.62% | C3A (>0.64) | 6.97% |
| Silicon Dioxide, SiO2 | 18.65% | C4AF (>0.64) | 9.50% |
| Phosphorus Pentoxide, P2O5 | 0.10% | ss(C4AF + C2F) | 15.03% |
| Sulfur Trioxide, SO3 | 3.39% | C3S (>0.64) | 69.98% |
| Chloride, Cl | 0.39% | Alkali, Na2O | 0.41% |
| Potassium Oxide, K2O | 0.48% | | |
| Calcium Oxide, CaO | 61.67% | | |
| Titanium Dioxide, TiO2 | 0.30% | | |
| Manganese Oxide, Mn2O3 | 0.04% | | |
| Iron Oxide, Fe2O3 | 3.12% | | |
| Strontium Oxide, SrO | 0.05% | | |

| Chemical | ML Bulk |
|---|---|
| Sodium Oxide, Na2o | 27.00% |
| Magnesium Oxide, MgO | 2.25% |
| Aluminum Oxide, Al2O3 | 19.86% |
| Silicon Dioxide, SiO2 | 53.53% |
| Phosphorus Pentoxide, P2O5 | 0.05% |
| Sulfur Trioxide, SO3 | 0.37% |
| Potassium Oxide, K2O | 1.58% |
| Calcium Oxide, CaO | 8.95% |
| Titanium Dioxide, TiO2 | 1.10% |
| Iron Oxide, Fe2O3 | 7.45% |

Results achieved for the lab batch:

| Physical Analysis | Results | ASTM |
|---|---|---|
| Compressive Strength (psi) | | C-109-99 |
| 3 hours | 1990 | |
| 24 hours | 3740 | |
| 7 days | 8700 | |
| 28 days | 11010 | |
| Bond Strength (Concrete) (psi) | | C-928, C-882 |
| 4 hours | 334 | |
| 1 day | 1124 | |
| 7 days | 1484 | |
| Bond Strength (Asphalt) (psi) | | C-928, C-882 |
| 4 hours | 285 | |
| 7 days | 294 | |
| 7 days | 495 | |
| Set Time (minutes) | | C-266 |
| Initial | 26 | |
| Final | 31 | |

Thus, in accordance with the present invention, a composition has been given for a hydraulic cement which has a retarded set time resulting in a hardened material that can be placed in service useful as mortar or concrete.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. Method of inhibiting the setting time of a hydraulic cement mixture comprising mixing said hydraulic cement mixture with a retarder slurry having an acidic pH, said retarder slurry comprising an hydroxycarboxylic acid and a pH balancing agent, said pH balancing agent comprising a member selected from the group consisting of alkali and alkaline earth metal hydroxides and salts of said acid.

2. Method as recited in claim 1 wherein said pH balancing agent comprises a salt of said hydroxycarboxylic acid.

3. Method as recited in claim 2 wherein said acid comprises at least two carboxy functional groups.

4. Method as recited in claim 3 wherein said acid comprises a member selected from the group consisting of citric, malic, malonic, glyoxylic and glycolic acids.

5. Method as recited in claim 4 wherein said acid is citric acid.

6. Method as recited in claim 5 wherein said pH is about 4 to about 6.

7. Method as recited in claim 6 wherein said retarder slurry further comprises a member selected from sugar and metal salts.

8. Method as recited in claim 1 wherein about 1–12 wt % of said retarder slurry is mixed with about 100 parts by weight of said hydraulic cement mixture.

9. Retarder slurry composition for delaying the setting time of a hydraulic cement mixture, said retarder slurry having an acidic pH and comprising an hydroxycarboxylic acid and a pH balancing agent said pH balancing agent comprising a member selected from the group consisting of alkali and alkaline earth metal hydroxides and salts of said acid.

10. Composition as recited in claim 9 wherein said pH balancing agent comprises a salt of said hydroxycarboxylic acid.

11. Composition as recited in claim 9 wherein said hydroxycarboxylic acid comprises at least two carboxy functional groups.

12. Composition as recited in claim 11 wherein said hydroxycarboxylic acid comprises a member selected from the group consisting of citric, malic, malonic, glyoxylic and glycolic acids.

13. Method as recited in claim 12 wherein said hydroxycarboxylic acid is citric acid.

14. Method as recited in claim 13 wherein said pH is about 4 to about 6.

15. Method as recited in claim 14 wherein said retarder slurry further comprises a member selected from sugar and metal salts.

* * * * *